(12) United States Patent
Goi et al.

(10) Patent No.: US 9,890,839 B2
(45) Date of Patent: Feb. 13, 2018

(54) GENERATING DEVICE FOR AIRCRAFT

(75) Inventors: Tatsuhiko Goi, Kobe (JP); Kenichiro Tanaka, Kobe (JP); Koji Watanabe, Kobe (JP); Isao Fujii, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 586 days.

(21) Appl. No.: 14/110,050

(22) PCT Filed: Apr. 4, 2012

(86) PCT No.: PCT/JP2012/059246
§ 371 (c)(1),
(2), (4) Date: Oct. 4, 2013

(87) PCT Pub. No.: WO2012/137843
PCT Pub. Date: Oct. 11, 2012

(65) Prior Publication Data
US 2014/0038770 A1    Feb. 6, 2014

(30) Foreign Application Priority Data
Apr. 7, 2011    (JP) ................. 2011-085428

(51) Int. Cl.
*F02C 7/32*    (2006.01)
*F02C 7/36*    (2006.01)
(Continued)

(52) U.S. Cl.
CPC ............ *F16H 15/00* (2013.01); *F02C 7/275* (2013.01); *F02C 7/32* (2013.01); *F02C 7/36* (2013.01);
(Continued)

(58) Field of Classification Search
CPC .. F16H 15/00; F02C 7/28; F02C 7/275; F02C 7/36; F02C 7/32; F05D 2260/4031;
(Continued)

(56) References Cited

U.S. PATENT DOCUMENTS 2,978,869 A    4/1961  Hiscock et al.
3,799,476 A    3/1974  Bouiller et al.
(Continued)

FOREIGN PATENT DOCUMENTS

CN    1902389 A      1/2007
CN    101235753 A    8/2008
(Continued)

OTHER PUBLICATIONS

International Preliminary Report on Patentability dated Oct. 17, 2013, issued in International Application No. PCT/JP2012/059246.
(Continued)

*Primary Examiner* — Ted Kim
(74) *Attorney, Agent, or Firm* — Sughrue Mion, PLLC

(57) ABSTRACT

An electric power generating device (1) capable of suppressing an increase of a frontal surface area of an aircraft engine includes a transmission (22) connected with a rotary shaft (9) of the engine (E), an electric power generator (34) driven by an output of the transmission (22), an input shaft (27) having a shaft axis extending in a direction crossing the rotary shaft (9) and connected with the rotary shaft (9), and a transmitting mechanism (21) connected with the input shaft (27) to drive the transmission (22) about an axis extending in a direction perpendicular to the input shaft (27). The transmission (22) and the electric power generator (34) are disposed spaced a distance from each other in a direction circumferentially of the rotary shaft (9).

10 Claims, 6 Drawing Sheets

(51) Int. Cl.
*F16H 15/00* (2006.01)
*F02C 7/275* (2006.01)
(52) U.S. Cl.
CPC ............... *F05D 2260/4031* (2013.01); *F05D 2260/532* (2013.01); *F05D 2270/024* (2013.01); *F05D 2270/304* (2013.01); *Y02T 50/671* (2013.01)
(58) Field of Classification Search
CPC ......... F05D 2260/532; F05D 2270/304; F05D 2270/024
USPC .......................................................... 60/802
See application file for complete search history.

(56) References Cited

U.S. PATENT DOCUMENTS

| | | | |
|---|---|---|---|
| 4,252,035 A * | 2/1981 | Cordner | B64D 41/00 475/72 |
| 5,470,114 A | 11/1995 | Umney et al. | |
| 6,244,600 B1 | 6/2001 | Leturcq | |
| 6,561,940 B2 | 5/2003 | Goi et al. | |
| 7,386,983 B2 | 6/2008 | Miller | |
| 7,707,909 B2 | 5/2010 | Linet et al. | |
| 7,728,447 B2 | 6/2010 | Becquerelle et al. | |
| 7,757,655 B2 | 7/2010 | Inui et al. | |
| 8,113,005 B2 | 2/2012 | GÖTz et al. | |
| 8,449,431 B2 | 5/2013 | Goi et al. | |
| 8,905,191 B2 | 12/2014 | Brandt et al. | |
| 2001/0003108 A1 | 6/2001 | Goi et al. | |
| 2005/0183529 A1 | 8/2005 | Miller | |
| 2006/0248900 A1* | 11/2006 | Suciu | F02C 7/36 60/802 |
| 2007/0130959 A1 | 6/2007 | Linet et al. | |
| 2007/0173365 A1 | 7/2007 | Linet et al. | |
| 2008/0238098 A1 | 10/2008 | Becquerelle et al. | |
| 2008/0257298 A1 | 10/2008 | Inui et al. | |
| 2009/0165464 A1 | 7/2009 | Gotz et al. | |
| 2009/0324396 A1* | 12/2009 | Short | F02C 7/32 415/175 |
| 2010/0200692 A1 | 8/2010 | Goi et al. | |
| 2010/0300117 A1 | 12/2010 | Moulebhar | |
| 2011/0284328 A1 | 11/2011 | Brandt et al. | |

FOREIGN PATENT DOCUMENTS

| | | |
|---|---|---|
| CN | 101410591 A | 4/2009 |
| EP | 1106870 A2 | 6/2001 |
| EP | 1980732 A2 | 10/2008 |
| JP | 55-027582 A | 2/1980 |
| JP | 2001158400 A | 6/2001 |
| JP | 2001317374 A | 11/2001 |
| JP | 3440287 B | 8/2003 |
| JP | 200882208 A | 4/2008 |
| JP | 2008-190526 A | 8/2008 |
| JP | 2009-532613 A | 9/2009 |
| JP | 2010-179815 A | 8/2010 |
| WO | 2005045215 A1 | 5/2005 |
| WO | 2010086422 A1 | 8/2010 |

OTHER PUBLICATIONS

Communication from United States Patent and Trademark Office dated Feb. 1, 2016 in U.S. Appl. No. 14/110,016.
Communication dated Mar. 25, 2015, issued by the European Patent Office in corresponding European Application No. 12767296.2.
Communication dated Mar. 23, 2015, issued by the European Patent Office in corresponding European Application No. 12767294.7, which corresponds to U.S. Appl. No. 14/110,016.
Communication dated Jul. 8, 2014, issued by the Japanese Patent Office in counterpart Japanese application No. 2013-508911.
Communication dated Jun. 17, 2016, issued by the U.S. Patent and Trademark Office in counterpart U.S. Appl. No. 14/110,016.
Communication dated May 30, 2017, from the United States Patent and Trademark Office in counterpart U.S. Appl. No. 14/110,016.
Communication dated Nov. 22, 2016, issued by the U.S. Patent and Trademark Office in related U.S. Appl. No. 14/110,016.

* cited by examiner

GENERATING DEVICE FOR AIRCRAFT

CROSS REFERENCE TO THE RELATED APPLICATION

This application is a National Stage of International Application No. PCT/JP2012/059246 filed Apr. 4, 2012, claiming priority based on Japanese Patent Application No. 2011-085428, filed Apr. 7, 2011, the contents of all of which are incorporated herein by reference in their entirety.

BACKGROUND OF THE INVENTION

Field of the Invention

The present invention relates to an aircraft generating device for driving an electric generator coupled with an aircraft engine.

Description of Related Art

The use has hitherto been known of an IDG system (Integrated Drive Generator system), in which a continuously variable transmission is used for an electric generator used in a large scale aircraft so that the electric generator can be driven at a constant number of revolutions regardless of the number of revolutions of the engine to generate an electric power of a constant frequency. The generator device of the IDG system referred to above has also been known in which a traction continuously variable transmission, combined with a planetary gear transmission for compensating for the low mechanical efficiency of such traction continuously variable transmission, is provided with a constant speed drive device of a power split type for distributing and loading a power between those transmissions by means of a power splitting shaft. In this respect, see the patent document 1 listed below.

On the other hand, the aircraft engine of a two shaft type or double shaft type has been largely utilized in which are provided a hollow high pressure shaft, which is drivingly coupled with a compressor and a high pressure turbine, and a low pressure shaft, inserted in the hollow of the high pressure shaft and drivingly connecting between a fan and a low pressure turbine. In particular, since in the aircraft generating device equipped with the constant speed drive device of the power split type referred to previously, the planetary gear transmission operates at a fixed gear ratio, the gear ration of the constant speed drive device as a whole is limited to a value smaller than about 2:1. Accordingly, in the case of the double shaft system, an input shaft of the constant speed drive shaft is drivingly connected with the high pressure shaft that is small in change of the number of revolutions.

In the meantime, the output of the electric power generating device of the conventional IDG system has hitherto been about 90 kVA, but the aircrafts in recent years have come to require a large electric capacity exceeding 200 kVA consequent upon the increasing utilization of electricity in those aircrafts. Where such a large electric capacity generation takes place, and if the electric power generating device is connected with the high pressure shaft of the aircraft engine as hereinabove discussed, a problem (stall) occurs in the operation of the high pressure shaft system when the electrical load of the aircraft becomes considerable, and, therefore, the connection of the electric power generating device with the high pressure shaft is not desirable. In view of this, the air craft electric power generating device has been suggested of the type that is driven by the rotation transmission of the low pressure shaft having a no limitation in load to be extracted. In this respect, see the patent document 2 listed below.

PRIOR ART LITERATURE

[Patent Document 1] Japanese Patent No. 3440287
[Patent Document 2] Japanese Laid-open Patent Publication No. 2010-179815

DISCLOSURE OF THE INVENTION

It has, however, been found that according to the patent document 2 referred to above, in the double shaft type fan engine including a compressor 2, a combustor 3 and a turbine 4 as shown in FIG. 10 of the accompanying drawing, a first accessory gearbox (AGB) 19 for driving other accessories or auxiliary equipments 18 such as, for example, a fuel pump and a hydraulic pump is drivingly connected with a high pressure shaft 8 for driving the compressor 2 and, separate from this first accessory gearbox 19, a second accessory gearbox (AGB) 73 is drivingly connected with a low pressure shaft 9 for driving a fan 10 through a connecting shaft 71 that extends in a radial direction thereof, with the electric power generating device 75 connected with such second accessory gearbox 73. In addition, a transmission and an electric power generator, both not shown, but accommodated within the electric power generating device 75, are both oriented in a direction, in which an engine longitudinal axis C extends, and are juxtaposed so as to extend one above the other. In this arrangement, the electric power generating device 75 is fitted in such a manner as to protrude a minimized distance laterally outwardly of the engine to provide an advantage of suppressing the possible increase of the front surface area of the engine, but the additional use of the accessory gearbox, that is, the use of the second accessory gearbox 73 brings about the increase in weight, cost, air resistance, as well as a reduction in reliability.

In view of the foregoing, the present invention has for its primary object to provide an aircraft electric power generating device which can be fitted to an aircraft engine with no need to use any additional accessory gearbox, particularly where a high capacity electric generation by a low pressure shaft drive takes place, and in a fashion suppressing the increase of the front surface area of the aircraft engine.

In order to accomplish the foregoing object, the present invention provides an electric power generating device adapted to be driven by an aircraft engine, which device includes a transmission connected with a rotary shaft of the engine, an electric power generator driven by an output of the transmission, an input shaft having a longitudinal axis extending in a direction crossing the rotary shaft and connected with the rotary shaft, and a transmitting mechanism connected with the input shaft to drive the transmission about an axis extending in a direction crossing the input shaft. The transmission and the electric power generator are disposed in a direction circumferentially of the rotary shaft and spaced a distance from each other. For example, the input shaft referred to above has a longitudinal axis extending in a direction radially of the rotary shaft whereas the transmitting mechanism drives the transmission about an axis lying perpendicular to the input shaft.

In this aircraft electric power generating device, the rotation of the input shaft disposed along the direction crossing the rotary shaft of the engine is, after having been converted by the transmitting mechanism into the rotation occurring about the axis crossing the input shaft, transmitted to the transmission and, therefore, the transmission can be disposed along the substantially anteroposterior direction of the aircraft engine. Also, the transmission and the electric power generator are disposed spaced a distance from each other in a direction circumferentially of the rotary shaft, for example, in an up and down direction. As a result, this electric power generating device as a whole has such a slim shape, long in the longitudinal direction and thin in thickness, that is, having a minimized amount of flange that protrudes outwardly from a lateral surface of the aircraft engine enough to permit it to be optimally fitted and, therefore, the increase of the air resistance of the aircraft can be suppressed to avoid the reduction in mileage.

Also, since the rotation of the input shaft crossing the rotary shaft of the engine is converted by the transmitting mechanism into the rotation about the axis extending in the direction crossing the input shaft, even when the electric power generating device is so designed as to be driven by the rotational transmission of the low pressure shaft in providing a large capacity electric generation, it can be accomplished without employing any accessory gearbox separately. Accordingly, the increase in weight resulting from the addition of the accessory gearbox, the increase of the cost, the increase of the air resistance and the reduction in reliability can be suppressed.

The input shaft referred to above is preferably disposed between the transmission and the electric power generator in the direction circumferentially of the rotary shaft. By so doing, the input shaft is positioned between the transmission and the electric power generator, each having a relatively great weight, that is, in the vicinity of the center of gravity of the electric power generating device. While a mounting surface of the electric power generating device which is fitted to the aircraft engine is disposed so as to encircle the input shaft, positioning of the input shaft in the vicinity of the center of gravity is advantageous in that the overhang moment of the electric power generating device relative to the mounting surface is minimized and the fitting of the electric power generator onto the aircraft engine is stabilized.

Also, in the practice of the present invention, the transmission and the electric power generator preferably have respective longitudinal axes that extend parallel to each other, and axial positions of at least portions thereof being overlapped one above the other. According to this feature, since the transmission and the electric power generator have the respective longitudinal axes that extend parallel to reach other, the both can be connected together by means of spur gears and the structure can therefore be simplified. At the same time, since the axial positions of at least that portion thereof are overlapped with each other, the axial length of the electric power generating device can be reduced.

In a preferred embodiment of the present invention, the electric power generating device is preferably driven by the engine comprising a low pressure shaft for driving a fan and a high pressure shaft for driving a compressor and in which the rotary shaft is the low pressure shaft. Unlike the high pressure shaft having a limitation on the take-out load in order to avoid the engine stall, the electric power generating device is driven to rotate by the low pressure shaft, having a minimized limitation of the take-out load, and accordingly, it is possible to increase the electric power generating capacity.

In the practice of the present invention, the transmission is preferably employed in the form of a traction continuously variable transmission. The use of the traction continuously variable transmission is effective to accommodate a large change in transmission gear ratio and, therefore, even through connected particularly with the low pressure shaft liable to considerably change in rotation, a large capacity electric power generation can be realized.

By way of example, the traction continuously variable transmission may be rendered to be of a double cavity type with an input unit provided at an intermediate portion in the axial direction thereof and an output unit on an outer side portion thereof. According to this construction, since the transmitting mechanism input shaft, which is connected with the input unit of the transmission through the transmitting mechanism, is disposed at the intermediate portion in the axial direction of the transmission, the transmitting mechanism input shaft can be easily brought to a position in the vicinity of the center of gravity of the electric power generating device with the previously discussed overhang moment being consequently reduced.

In another preferred embodiment of the present invention, the use may be made of a casing for accommodating the transmission and the electric power generator therein. In this case, the casing referred to above has an opening for the passage of the input shaft therethrough and a flange encircling a perimeter of the opening, the casing being fitted to the engine through such flange. The use of the casing is particularly advantageous in that, in a condition in which the input shaft protruding through the opening in the casing is connected with the rotary shaft of the engine, the electric power generating device can be stably fitted to the engine by means of an easy fitting work, for example, by butting the flange encircling the perimeter of the opening in the casing with a flange of the engine, and fixing them.

In a further preferred embodiment of the present invention, the transmission and the electric power generator may be connected together through an intermediate gear. By so doing, the rotation of the transmission can be transmitted through the intermediate gear to the electric power generator in a speed increased or reduced condition and, therefore, both of the transmission and the electric power generator can be driven at a proper rotational speed. Accordingly, the occurrence of a considerable mechanical loss, such as occurring when the rotation of the transmission is, after having been increased at once to the rotational speed at which the electric power generator is driven, transmitted, can be avoided.

Where the intermediate gear is employed as discussed above, the use is preferred of a pump that is connected with a gear shaft of the intermediate gear to supply a lubricant. In this case, the pump can be driven by the utilization of the rotation of the intermediate gear and the use of any drive system dedicated solely for driving the pump can be dispensed with. This makes it possible to supply the lubricant oil to component parts, that require oiling, with a simplified structure.

In a still further preferred embodiment of the present invention, the transmission and the electric power generator have respective longitudinal axes that extend parallel to the rotary shaft of the engine. Positioning of the respective longitudinal axes of the transmission and the electric power generator so as to extend parallel to the rotary shaft disposed in the anteroposterior direction of the engine is effective to reduce the surface area (frontal surface area) of a sectional surface perpendicular to the rotary shaft and also to render the shape of a nacelle, enclosing the aircraft engine, to be of such a shape suitable to suppress the increase of the frontal surface area of the engine.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described in detail with reference to the accompanying drawings.

Figure 1:
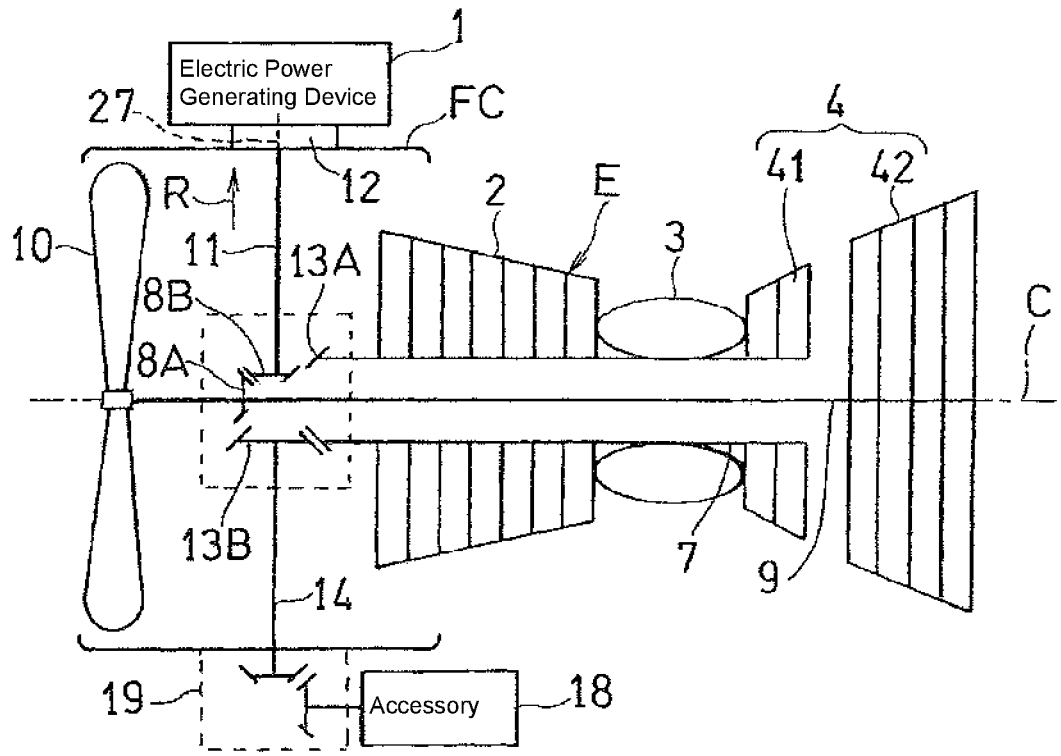
FIG. 1 is a schematic side view of an aircraft electric power generating device in accordance with a first preferred embodiment of the present invention, shown as connected to an aircraft engine.

FIG. 1 illustrates a structural diagram schematically showing a connection of an aircraft electric power generating device 1, which is designed in accordance with a first preferred embodiment of the present invention, with an aircraft engine E. The engine E is in the form of a two shaft type or double shaft type fan engine and includes a compressor 2, a combustor 3, a turbine 4 and a fan 10 as principal component parts. A compressed air supplied from the compressor 2 is mixed with fuel and is then burned in the combustor 3 and, thereafter, a high pressure combustion gas generated as a result of the combustion is supplied to the turbine 4.

The turbine 4 includes a high pressure turbine 41 on a front stage and a low pressure turbine on a rear stage, and the compressor 2 is fluid connected with the high pressure turbine 41 through a hollow high pressure shaft 7 and is therefore driven to rotate by the high pressure turbine 41. The fan 10 is drivingly connected with the low pressure turbine 42 through a low pressure shaft 9, which is inserted into the hollow of the high pressure shaft 7, and is driven by the low pressure turbine 42. The high pressure shaft 7 and the low pressure shaft 9 are so arranged as to be coaxially with a common engine longitudinal axis or a common engine shaft axis C. In this way, an engine thrust force can be obtained by a jet stream of the combustion gases, jetted from the low pressure turbine 42, and a high speed air stream generated by the fan 10.

A first bevel gear 8A is provided at a portion of the low pressure shaft 9 rearwardly of the fan 10, and a second bevel gear 8B meshed with the first bevel gear 8A is fixedly mounted on a first end of a first connecting shaft (take-out shaft) 11 which extends in a direction radially of the low pressure shaft 9. As will be detailed later, an input shaft of an electric power generating device 1 (transmission mechanism input shaft) is connected with a second end of the first connecting shaft 11, which is opposite to the first end thereof, so that the electric power generating device 1 can be driven by the low pressure shaft 9 by way of the bevel gear system referred to above. In other words, unlike the conventional standard aircraft electric power generating device in which the high pressure shaft 7 is used as a rotary drive shaft of the aircraft engine E, the low pressure shaft 9 is used as a rotary drive shaft for driving the electric power generating device 1 in the embodiment of the present invention now under discussion.

The first connecting shaft 11, although having its longitudinal axis extending in a direction radially of the low pressure shaft 9 that is one of the rotary drive shafts of the engine, has the first end thereof connected directly with an input shaft of the electric power generating device 1, best shown in FIG. 1, with no accessory gearbox, such as hitherto required in the conventional device, intervening between the input shaft and the low pressure shaft 9.

In the illustrated embodiment, the electric power generating device 1 is fitted through a mounting pad 12 to the fan casing FC which forms a portion of the engine main body EB of the engine E, the details of which will be discussed later. It is however to be noted that, as is the case with the conventional device, the high pressure shaft 7 has a front end drivingly connected with a first end portion of a second connecting shaft 14 through bevel gears 13A and 13B that are engaged with each other while a second end portion of the second connecting shaft 14 is drivingly connected with an accessory gearbox (AGB) 19 that is employed for driving an accessory 18 such as, for example, a fuel pump and/or an oil pump.

Figure 2:
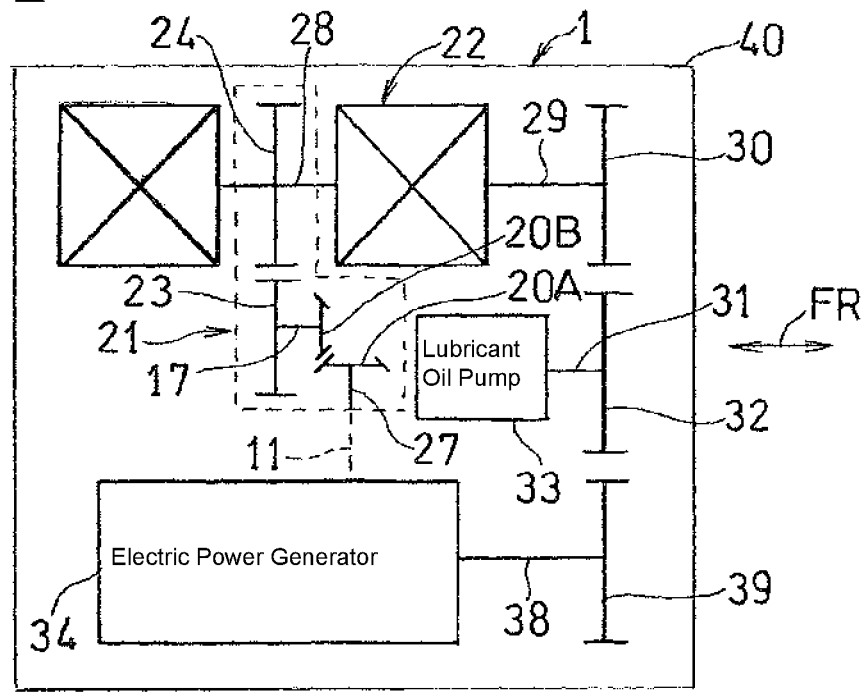
FIG. 2 is a diagram showing a schematic structure of the aircraft electric power generating device of FIG. 1.

Referring now to FIG. 2 showing a schematic diagram depicting a schematic structure of the electric power generating device 1 that is connected as an accessory, an input side of the electric power generating device 1 includes a transmission mechanism input shaft 27, having a first end portion connected directly with the first connecting shaft (take-out shaft) 11 of the engine E so as to extend in a radial direction R, as best shown in FIG. 1, and a transmission mechanism 21 connected with the transmission mechanism input shaft 27 and operable to drive a transmission 22 about an axis perpendicular to the first connecting shaft 11, that is, the engine shaft axis C in the instance as shown).

It is, however, to be noted that the input shaft 27 may not necessarily extend in the radial direction R best shown in FIG. 1, but may be inclined somewhat relative to the radial direction R. In other words, the input shaft 27 may work satisfactorily provided that it has a longitudinal axis extending in a direction intersecting the engine shaft axis C.

The transmission mechanism 21 referred to above includes a transmission shaft 17 having its longitudinal axis extending in an anteroposterior direction FR, a bevel gear 20A fixedly mounted on a second end portion of the transmission mechanism input shaft 27, which is opposite to the previously described first end portion thereof, a bevel gear 20B fixedly mounted on one end portion of the transmission shaft 17 and meshed with the bevel gear 20A, a transmission spur gear 23 fixedly mounted on the opposite end portion of the transmission shaft 17, and a spur gear 24 fixedly mounted on a transmission input shaft 28 and meshed with the transmission spur gear 23. The spur gear 24 referred to above serves as an input gear of the transmission 22.

A transmission output gear 30 fixedly mounted on a transmission output shaft 29 is meshed with an intermediate gear 32, which is in turn connected with a pump rotary shaft 31 for a lubricant oil pump 33 for rotation together therewith. Also, the intermediate gear 32 referred to above is also meshed with an electric power generator input gear 39 fixedly mounted on a rotary shaft 38 of an electric power generator 34. The transmission 22 and the electric power generator 34 are so disposed and so positioned as to be spaced a distance from each other in a direction circumferentially of the low pressure shaft 9, that is, circumferentially of the aircraft engine E.

It is to be noted that although the transmission output gear 30, the intermediate gear 32 and the electric power generator input shaft 39 are all in the form of a spur gear, but they may be employed in the form of a helical gear provided that the use is made of a thrust bearing.

Figure 3:
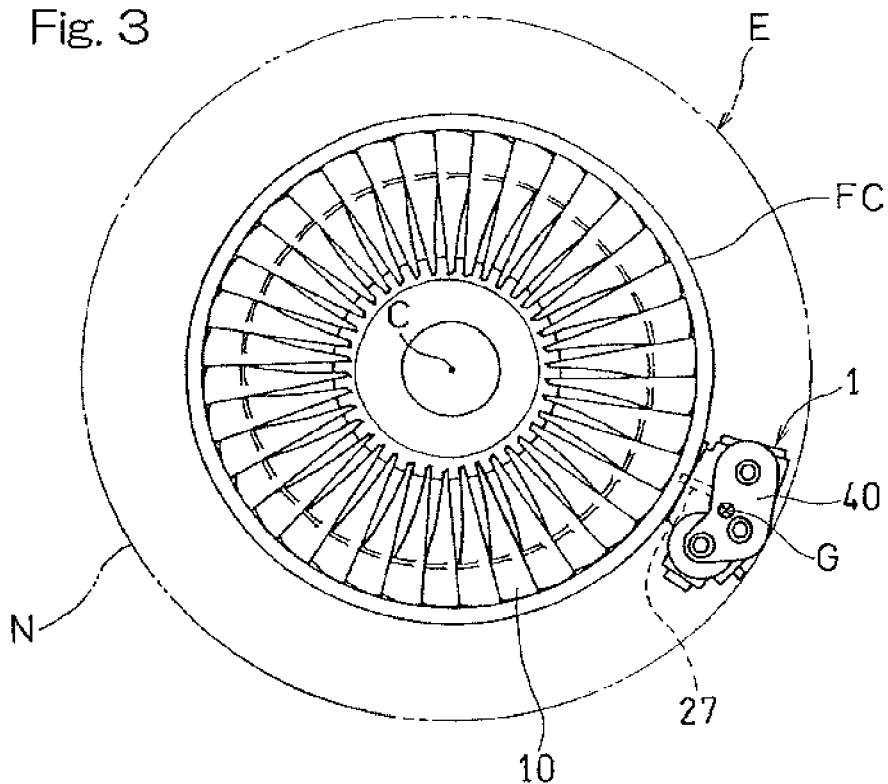
FIG. 3 is a front elevational view of the aircraft electric power generating device of FIG. 1 shown as fitted to the aircraft engine.
Figure 4:
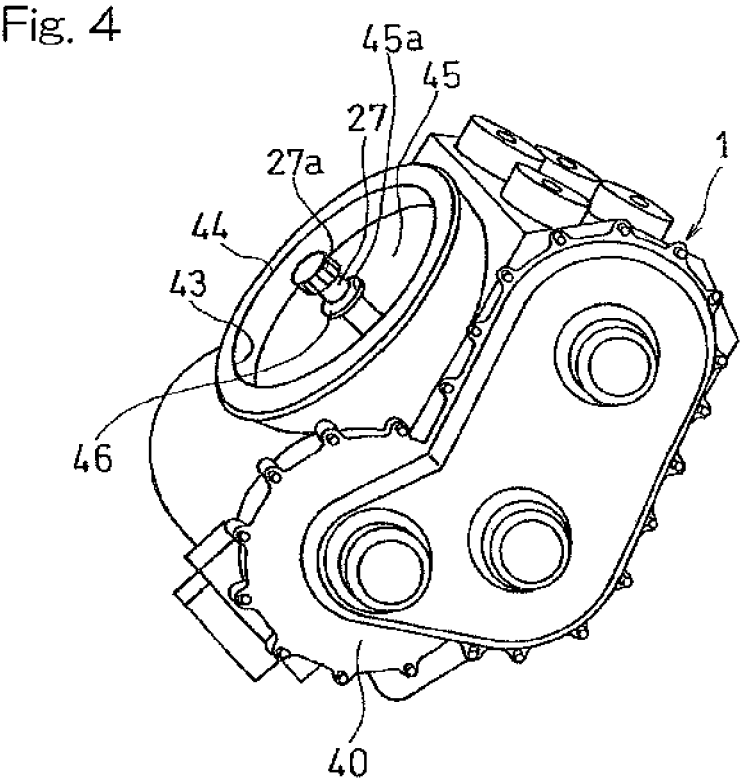
FIG. 4 is a perspective view showing the aircraft electric power generating device as viewed from a lateral direction.

FIG. 3 illustrates a front elevational view showing how the aircraft electric power generating device 1 is fitted onto the aircraft engine E. The electric power generating device 1 is fitted to a side portion of the fan casing FC of the aircraft engine E. As FIG. 3 makes it clear, the electric power generating device 1 is of a low profile structure with a small thickness, when viewed from front in a direction conforming to the engine shaft axis C, and is so formed as to have an oblong appearance with a great dimension in an up and down direction. Accordingly, the electric power generating device can be fitted to the side portion of the fan casing FC of the engine E with a minimized lateral protrusion. The engine E and the electric power generating device 1 are enclosed within an engine nacelle N. It is, however, to be noted that the electric power generating device 1 may be fitted to a side face portion of the main body casing BC rearwardly of the fan casing FC.

As shown in FIG. 2, an accessory casing 40 of the electric power generating device 1 encloses the transmission 22, the electric power generator 34, the oil pump 33 and the transmission mechanism 21. As best shown in FIG. 2, the accessory casing 40 has an opening 43 through which the transmission mechanism input shaft 27 extends, an accessory flange 44 surrounding the periphery of the opening 43, and a first covering wall 45 for closing the opening 43 and having a throughhole 45a defined at a center portion thereof for the passage of the input shaft 27 therethrough. In the throughhole 45a referred to above is disposed a first sealing member 46 for sealing a gap between the first covering wall 45 and the input shaft 27. The first covering wall 45 is used to avoid an undesirable ingress of foreign matters during, for example, storage and/or transportation and, accordingly, the use thereof may be dispensed with if so desired.

Figure 5:
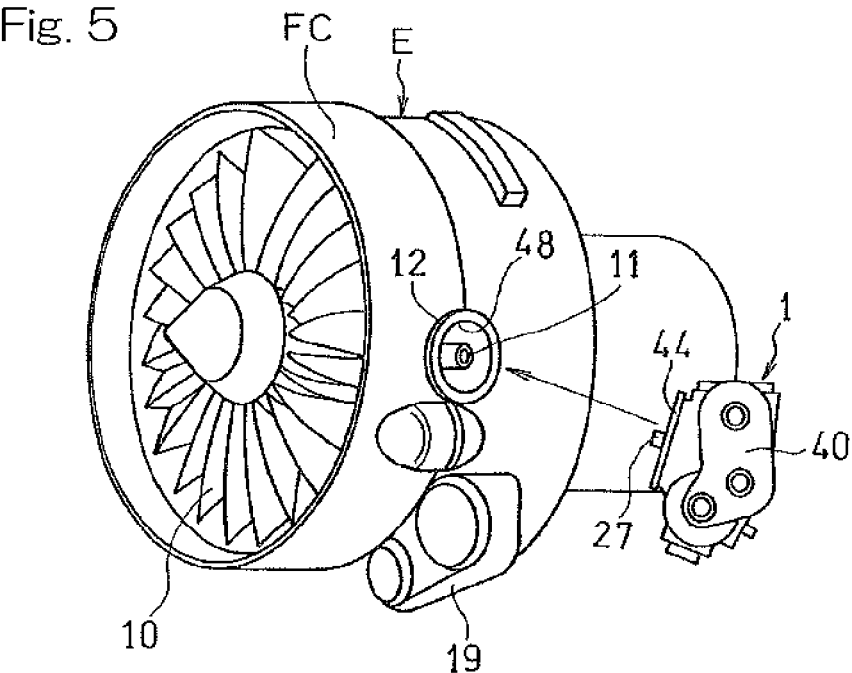
FIG. 5 is a perspective view showing a relative arrangement with the aircraft engine of the aircraft electric power generating device of FIG. 1.

On the other hand, as shown in FIG. 5, the fan casing FC of the aircraft engine E is provided with not only the previously described accessory gearbox 19, but also an opening 48 for the passage of the first connecting shaft 11 therethrough and the previously described mounting pad 12 that defines a perimeter surrounding an outer periphery of the opening 48.

Figure 6:
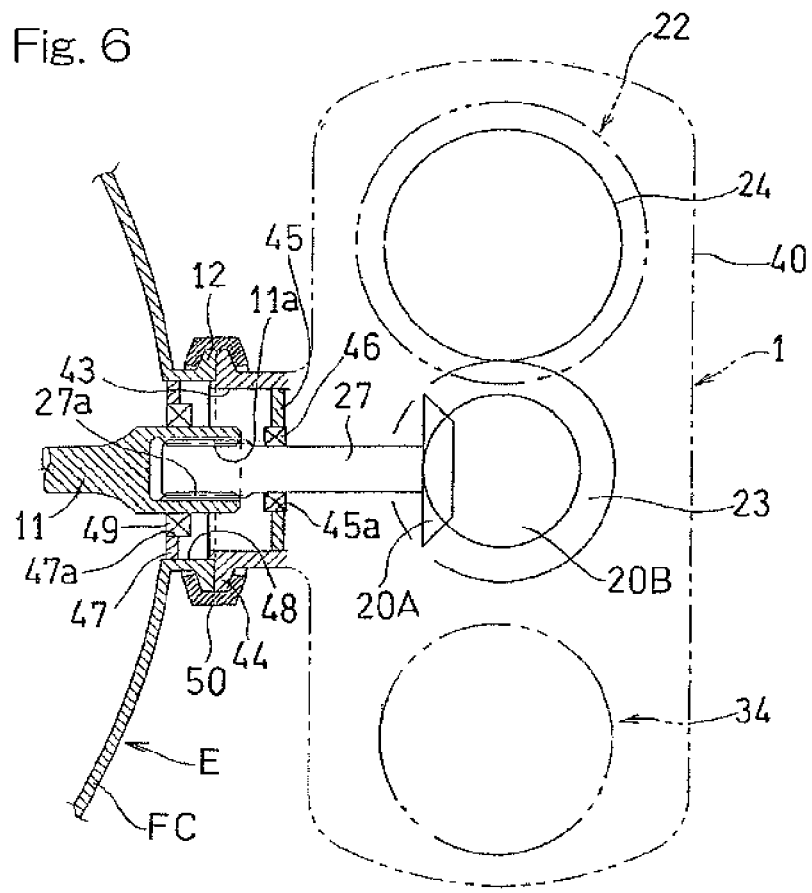
FIG. 6 is a sectional view showing the connection of the aircraft electric power generating device of FIG. 1 with the aircraft engine.

The casing 40 of the electric power generating device 1 is secured to the fan casing FC of the engine E by means of such a structure as shown in FIG. 6. More specifically, in a condition in which the mounting flange 44 is butted against the mounting pad 12 then encircling the opening 48, a V-sectioned clamp band 50 is placed over the joint between the mounting flange 44 and the mounting pad 12 to thereby connect them together with the electric power generating device 1 consequently fitted to the engine E. The second end of the first connecting shaft 11 has an axially recessed socket having its inner peripheral surface formed with an inner peripheral splined keys or grooves 11a and, on the other hand, that one end of the transmitting mechanism input shaft 27 has its outer peripheral surface formed with an outer peripheral splined grooves or keys 27a engageable with the inner peripheral splined keys or grooves 11a. Accordingly, the splined engagement between the splines 11a and 27a results in the transmitting mechanism input shaft 27 to be connected with the first connecting shaft 11 for rotation together therewith, but to be axially removable from the first connection shaft 11. The opening 48 referred to above is closed by a second covering wall 47 having a throughhole 47a defined at an intermediate portion for the passage of the first connecting shaft 11, and a second sealing member 49 is disposed in the throughhole 47a for sealing a gap between the second covering wall 47 and the first connecting shaft 11.

Figure 7:
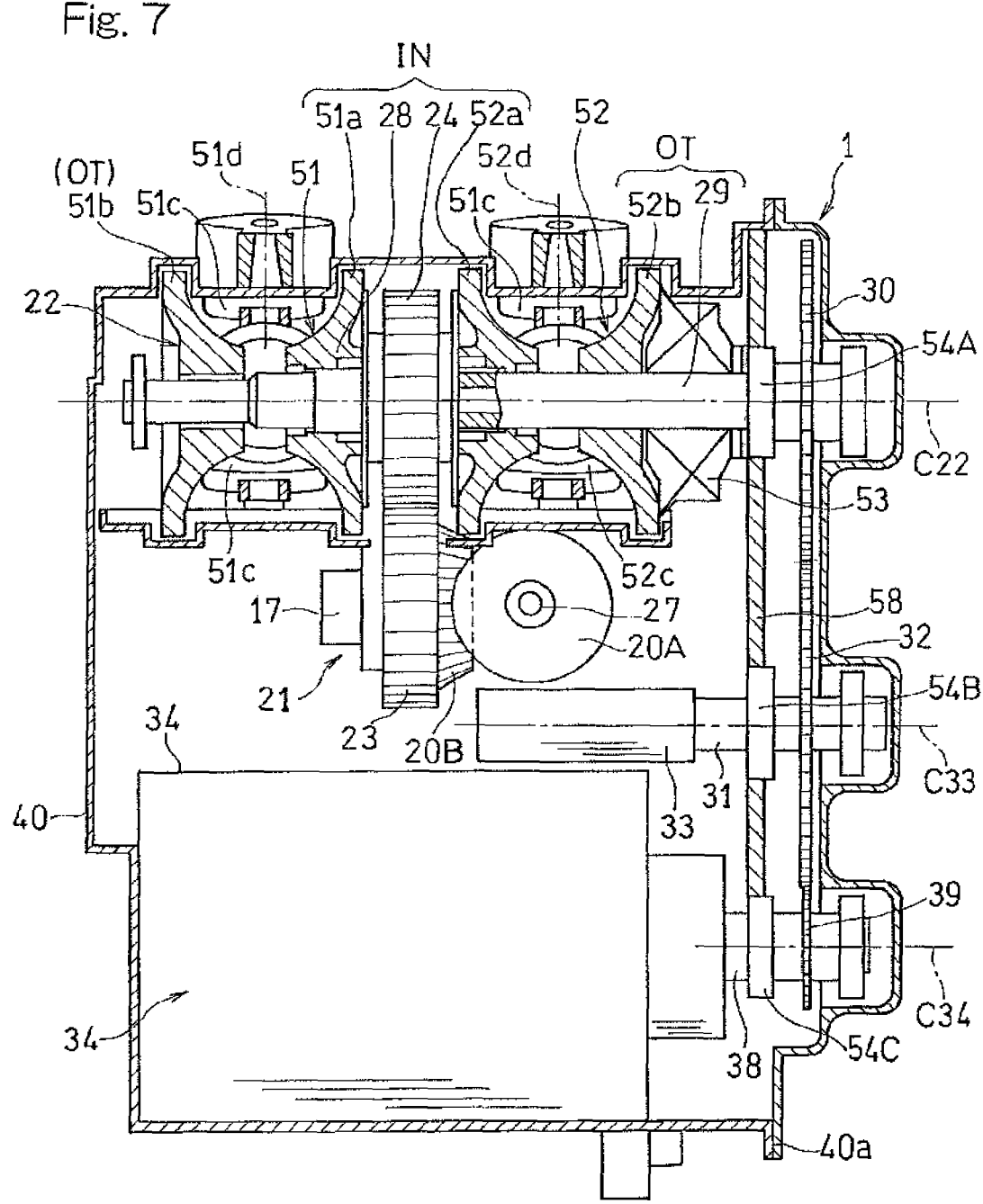
FIG. 7 is a longitudinal sectional view of the aircraft electric power generating device of FIG. 1.

The electric power generating device 1 includes, as shown in FIG. 7, the transmission mechanism input shaft 27 splined in such a manner as shown in FIG. 6 to the first connecting shaft 11 drivingly connected with the low pressure shaft 9 of the aircraft engine E, the variable speed traction transmission 22 drivingly connected with the transmission mechanism input shaft 27 through the transmission mechanism 21, the electric power generator 34 disposed below the traction transmission 22 and driven by an output of the traction transmission 22, and the lubricant oil pump 33 disposed between the traction transmission 22 and the electric power generator 34 and driven by the output of the traction transmission 22. The transmission mechanism 21, the traction transmission 22, the electric power generator 34 and the lubricant oil pump 33 have respective shaft axes C22, C34 and C33 that extend parallel to each other and also extend along the anteroposterior direction FR of the engine E, that is, the engine shaft axis C.

It is to be noted that the shaft axis C22 of the transmission 22 that is driven through the transmitting mechanism 21 may however have an axis that extends in a direction somewhat inclined from a direction perpendicular to the input shaft 27. In other words, the present invention should be construed as encompassing the transmitting mechanism 21, provided that such transmitting mechanism 21 can drive the transmission 22 about the shaft axis C22 that extends in a direction to cross the input shaft 27.

The oil pump 33 has the greatest length in the axial direction, followed by that of the electric power generator 34 and then followed by that of the transmission 22. The whole of the axial position of the oil pump 33 directly overlaps the transmission 22 and half or more thereof overlaps the electric power generator 34. The whole of the axial position of the electric power generator 34 overlaps the transmission 22. It is, however, to be noted that the transmission 22 and the electric power generator 34 may be somewhat displaced in the axial direction so that halves or more of them may overlap. The traction transmission 22, the electric power generator 34 and the oil pump 33 are accommodated within the casing 40 that is axially divided and connected by means of a casing flange 40a.

The traction transmission 22 referred to above includes the transmission output shaft 29 inserted through the hollow of the previously described transmission input shaft 28 and disposed coaxial with the transmission input shaft 28. In this embodiment now under discussion, the traction transmission 22 is of a half-troidal traction drive model of a double cavity type in which first and second cavities 51 and 52 are disposed along the transmission output shaft 29 and spaced a predetermined distance from each other. First and second input discs 51a and 52a are disposed axially inwardly of the each of the cavities 51 and 52 and first and second output discs 51b and 52b are disposed outside each of the cavities 51 and 52. The both of the input discs 51a and 52a are connected with the transmission shaft 28 for rotation together therewith and the both of the output discs 51b and 52b are connected with the transmission output shaft 29 for rotation together therewith.

In other words, an intermediate portion of the transmission 22 in the direction of its shaft axis C22 forms an input unit IN including an input gear 24, the transmission input shaft 28 and the input discs 51a and 52a, and on an outer side portion in the direction of the shaft axis C22, forms an output unit OT including the transmission output shaft 29 and the output discs 51b and 52b. In the illustrated embodiment now under discussion, a power split system (such as disclosed in the previously mentioned patent document 1) having a power dividing shaft is not employed and only the traction transmission 22 constitutes a constant speed drive device.

The first cavity 51 is provided with a first power roller 51c, the second cavity 52 is provided with a second power roller 52c, and an axial force generating mechanism 53 for generating a pressing force, with which the power rollers 51c and 52c are pressed in the axial direction, is disposed at a proximate position axially outwardly of the second output disc 52b.

Each of the power rollers 51c and 52c is supported for rotation about a corresponding roller axis 51d or 52d and also for tilting motion in a plane containing the roller axis 51d or 52d and the transmission input shaft 28. On the other hand, each of the cavities 51 and 52, three rolling elements including the corresponding input disc 51a or 52a, the similarly corresponding output shaft 51b or 52b and the associated power roller 51c or 52c are pressed towards each other by the axial force generating mechanism 53 so that a driving force is transmitted thereto by means of a shearing resistance of a highly viscous lubricant oil film having a high viscosity, which force is developed at an area of contact therebetween. In other words, a drive power transmission between the first input disc 51a and the first output disc 51b is achieved by a fluid friction between them and the first power roller 51c and, on the other hand, a drive power transmission between the second input disc 52a and the second output disc 52b is achieved by a fluid friction between them and the second power roller 52c. A pair of power rollers, similar to the power rollers 51c and 52c, are also disposed at an opposite position spaced 180° about the transmission shaft axis C22 from the power rollers 51c and 52c.

Change of the acceleration ratio and the reduction gear ratio, that is, change of the transmission gear ratio can be accomplished by controlling the angle of tilted motion, which is an inclination, of the roller axes 51d and 52d of the power rollers 51c and 52c through a control mechanism (not shown). The transmission gear ratio is arbitrarily changed within a predetermined range, for example, within the range of 0.5 to 2.0. Although in this case, when expressed in terms of the reduction gear ratio, it is within the range of 4:1, but it may be within the range of 5:1 or more.

The previously described oil pump 33 rotatable together with the intermediate gear 32 is disposed between the traction transmission 22 and the electric power generator 34. Accordingly, the electric power generator 34 is driven when the rotation of the transmission output shaft 29 is transmitted thereto through the transmission output gear 30, the intermediate gear 32 and the electric power generator input gear 39. At this time, the oil pump 33 is driven by the utilization of the rotation of the intermediate gear 32. A support wall 58 provided in the casing 40 has fitted thereto respective bearings 54A, 54B and 54C for rotatably supporting the transmission output shaft 29, the pump drive shaft 31 and the electric power generator rotary shaft 38. In this electric power generating device 1, by means of the setting of the transmission gear ratio between the transmission output gear 30 and the electric power generator input gear 39, the rotation of the traction transmission 22 is increased.

When the electric power generator 34 is driven to rotate by the engine E through the traction transmission 22, it functions as an electric power generator to supply an electric power to various electric loads such as, for example, an aircraft lighting system, an aircraft air conditioner system and an aircraft anti-icing system. It is to be noted that although the traction transmission 22 has been shown and described as positioned above the electric power generator 34, the traction transmission 22 and the electric power generator 34 may be reversed in position relative to each other.

Also, the rotational speed of the transmission output shaft 29 of the traction transmission 22 can be maintained at a constant value when the angles of tilt of the roller shaft axis 51d and 52d are, while a predetermined relationship therebetween is maintained, changed in dependence on the change of the rotational speed of the transmission input shaft 28. In other words, when the transmission gear ratio is so controlled that the change in the rotational speed or number of revolutions of the transmission input shaft 28 can be counterbalanced by the traction transmission 22, the rotational speed of the transmission output shaft 29 can be maintained at a constant value. Since the constant rotational speed of the transmission output shaft 29 is, after having been increased in speed by the intermediate gear 32, transmitted to the electric power generator 34, the electric power generator 34 rotates at a high speed at a constant number of revolutions at all times to output an alternating electric power of a constant frequency.

In the description that follows, the operation of the aircraft electric power generating device 1 according to the above described embodiment of the present invention will be described. The rotation of the low pressure shaft 9 of the engine E shown in FIG. 1 is transmitted to the electric power generating device 1 through the first connecting shaft 11 and the transmitting mechanism input shaft 27 shown in FIG. 2. In the electric power generating device 1, the power is transmitted from the transmitting mechanism input shaft 27 to the electric power generator 34 through the transmitting mechanism 21, the traction transmission 22 and the intermediate gear 32 and an electric power is generated by the rotation of the electric power generator 34.

Figure 8:
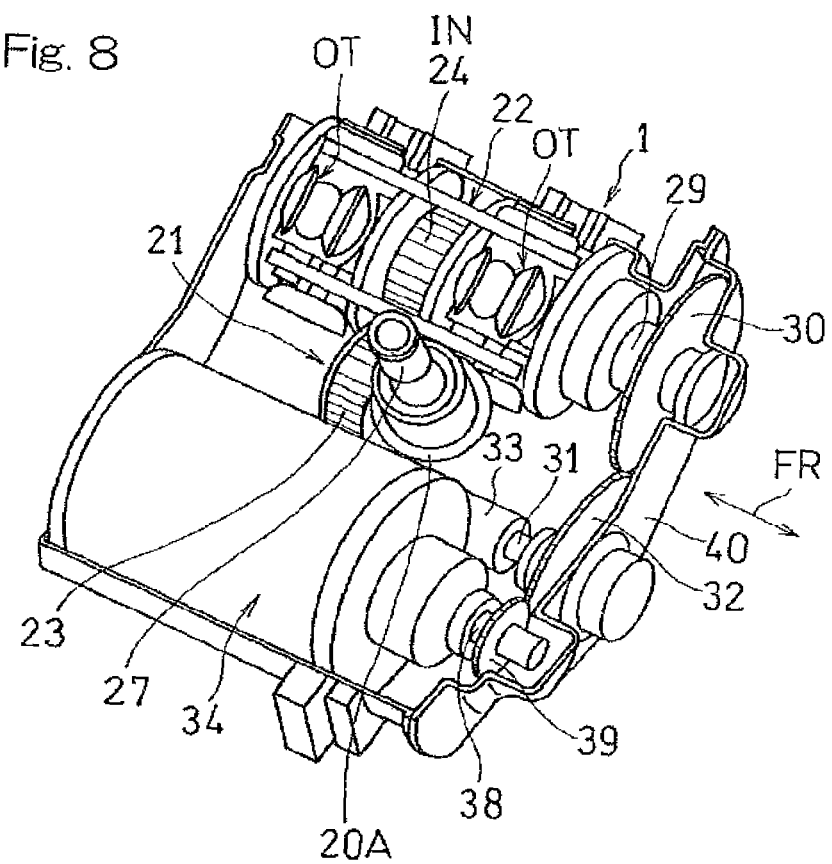
FIG. 8 is a perspective view, as viewed from front, showing the structure within a casing of the aircraft electric power generating device of FIG. 1.

As shown in FIG. 7, the aircraft electric power generating device 1 according to the embodiment of the present invention is of a structure in which the transmitting mechanism 21, the traction transmission 22, the electric power generator 34 and the oil pump 33 are all accommodated within the casing 40 of the two-component type and are, as FIG. 3 makes it clear, snugly and neatly accommodated therein to provide a low-profiled aircraft electric power generating device 1 having a longitudinally elongated appearance. Such a compactization is achieved because as shown in FIG. 8, the transmission 22, the electric power generator 34 and the oil pump 33, all elongated in the axial direction, are placed having been oriented in the anteroposterior direction, that is, the respective shaft axes C22, C34 and C33 of the transmission 22, electric power generator 34 and oil pump 33 are laid parallel to each other and also to the engine shaft axis C and, also, because the transmission 22, the electric power generator 34 and the oil pump 33 are arranged having been spaced in the direction circumferentially of the engine E shown in FIG. 3.

In other words, that is because, when viewed in the axial direction of the traction transmission 22, the traction transmission 22, the electric power generator 34 and the oil pump 33 are arranged on a geometrically bow-shaped placement line having an axis parallel to the engine shaft axis C shown in FIG. 1 and also substantially coaxial with the engine shaft axis C. Accordingly, the electric power generating device 1 has such a slim shape, long in the longitudinal direction and thin in thickness, that is, having a minimized amount of protrusion outwardly from a lateral surface of the aircraft engine E enough to permit it to be optimally fitted and, therefore, the shape of a nacelle enclosing the engine E can be made to a shape optimum in suppressing the increase of the frontal surface area to thereby avoid the reduction in mileage by suppressing the increase of the air resistance of an aircraft. It has, however, to be noted that the transmission shaft axis C22, the generator shaft axis C34 and the pump shaft axis C33 may be somewhat inclined circumferentially about the engine shaft axis C, shown in FIG. 3, relative to the engine shaft axis C, that is, the anteroposterior direction FR.

Also, since the axial positions of at least portions of the traction transmission 22, the electric power generator 34 and the oil pump 33 are overlapped one above the other, the axial length of the electric power generating device 1 can be reduced. Since the respective shaft axes C22 and C34 of the transmission 22 and the electric power generator 34 are parallel to each other and, accordingly, the transmission 22 and the electric power generator 34 can be connected with each other by means of the simple spur gears, the structure of the electric power generating device 1 can be simplified.

The electric power generating device of the present invention is of the structure in which the transmitting mechanism input shaft 27 is arranged along the radial direction of the low pressure shaft 9 of the engine E and the rotation of the input shaft 27 is, after having been converted by the transmitting mechanism 21 in a direction crossing the transmitting mechanism input shaft 27, transmitted to the transmission 22. Accordingly, there is no need to use the accessory gearbox separately when the electric power generator 34 is mechanically connected with the low pressure shaft 9 for the purpose of providing a large capacity electric generation. As a result, the possible increase of the weight resulting from the addition of the accessory gearbox, the increase of the cost, the increase of the air resistance and the reduction in reliability can be suppressed.

In addition, since in this electric power generating device 1, the transmitting mechanism input shaft 27 shown in FIG. 8 is disposed intermediate between the traction transmission 22 and the electric power generator 34 in the circumferential direction of the low pressure shaft 9, positioning of the transmitting mechanism input shaft 27 between the traction transmission 22 and the electric power generator 34, each having a relatively large weight, allows the transmitting mechanism input shaft 27 to be positioned in the vicinity of the center of gravity G, shown in FIG. 3, of the electric power generating device 1. As a result, the overhang moment of the center of gravity G relative to the mounting flange 44 forming a mounting surface of the electric power generating device 1 onto the aircraft engine E is minimized and the mounting of the electric power generating device 1 onto the aircraft engine E is stabilized accordingly.

Since the transmitting mechanism input 27 connected with the input unit IN of the transmission 22 through the transmitting mechanism 21 is disposed at an intermediate portion of the transmission 22 in the direction of the transmission shaft axis C22, it is easy to bring the transmitting mechanism input shaft 27 to a position adjacent the center of gravity of the electric power generator 34 and, therefore, the overhang moment referred to above can be further minimized. It is to be noted that although the transmitting mechanism input shaft 27 may be positioned above the traction transmission 22, the overhang moment of the center of gravity G relative to the mounting flange 44 will increase.

The casing 40 for accommodating the traction transmission 22 and the electric power generator 34 of the electric power generating device 1 shown in FIG. 6 has the opening 43 for the passage of the transmitting mechanism input shaft 27 therethrough and the mounting flange 44 encircling the perimeter of the opening 43 and is so designed as to be fitted to the engine E through the mounting flange 44. Accordingly, when the mounting flange 44 encircling the perimeter of the opening 43 in the casing 40 is connected with, for example, the mounting pad 12 of the engine E in a fashion butted against the mounting pad 12, the electric power generating device 1 can be stably fitted to the engine E by means of an easy mounting work.

Yet, the electric power generating device 1 according to the foregoing embodiment of the present invention includes a constant drive mechanism for transmitting the rotation of the engine E to the electric power generator 34 through only the traction transmission 22 without employing the power split system, and, therefore, setting of the maximum transmission gear ratio to about 5:1 becomes possible and, hence, the electric power generator 34 can be rotated at a constant speed even when connected with the low pressure shaft 9 of the engine E liable to change considerably in the rotational speed.

Further, while the engine stall is apt to occur at the time of a low engine output (during, for example, idling on the ground or descending) if a large load is taken out from the high pressure shaft 7 connected with the compressor 2, the electric power generating device 1, which is a load, is driven to rotate by the low pressure shaft 9, having a minimized limitation of the take-out load, through the first connecting shaft 11. Accordingly, it is possible to increase the electric power generating capacity with the utilization of the large sized discs 51a, 51b, 52a and 52b in the traction transmission 22 shown in FIG. 7. Since in such case the output rotation of the traction transmission 22 is increased in speed through the intermediate gear 32 to allow the electric power generator 34 to be rotated at a high speed, it becomes possible to reduce the torque of the transmission 22 to thereby suppress an undesirable excessive increase in size and weight.

Geared connection of the traction transmission 22 with the electric power generator 34 through the intermediate gear 32 makes it possible to transmit the rotation of the traction transmission 22 to the electric power generator 34 after it has been increased in speed through the intermediate gear 32. Accordingly, the traction transmission 22 and the electric power generator 34 can be driven each at a proper rotational speed and it is therefore possible to avoid the occurrence of a large loss which would occur when the rotation of the traction transmission 22 is all at once increased in speed to attain the rotational speed at which the electric power generator 34 is driven. Also, since the oil pump 33 is driven with the utilization of the rotation of the intermediate gear 32 for speed increasing, the use of a drive system solely dedicated for driving the oil pump 33 can be dispensed with and, as a result, the lubricant oil can be supplied to portions of the transmission 22 and the electric power generator 34, where oiling is required, with a simplified and inexpensive structure.

Figure 9:
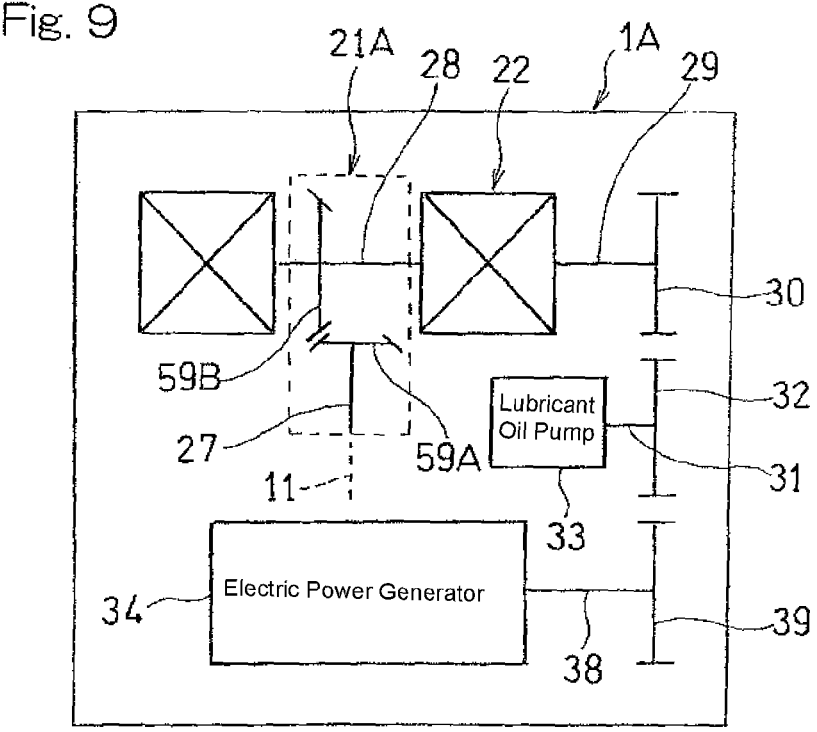
FIG. 9 is a diagram showing a schematic structure of the aircraft electric power generating device in accordance with a second preferred embodiment of the present invention.
Figure 10:
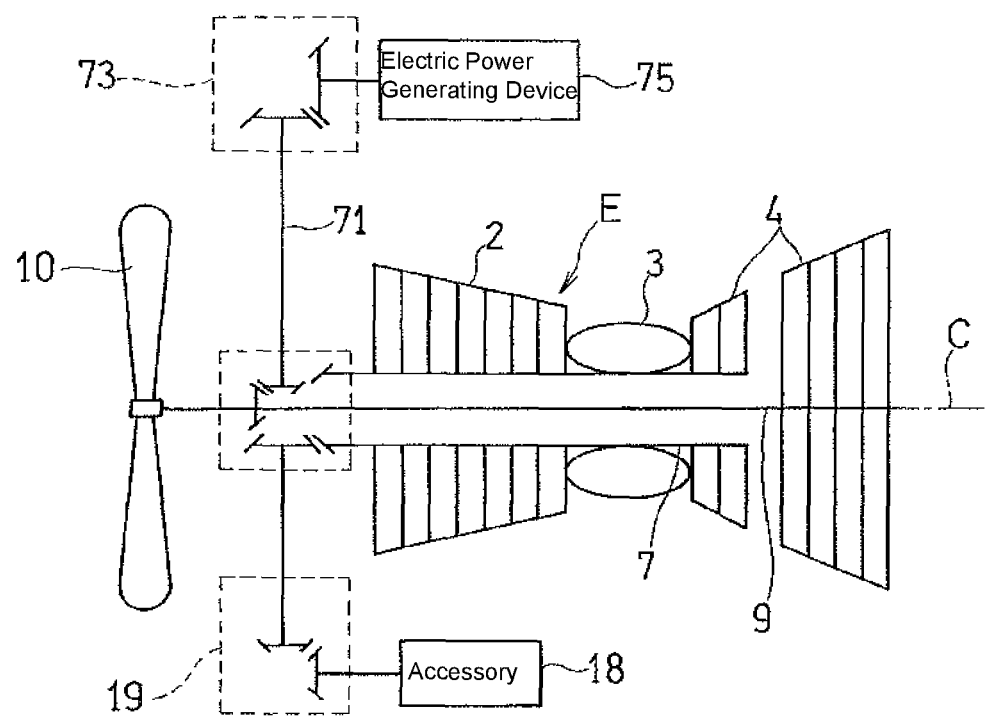
FIG. 10 is a schematic side view showing one example of the conventional aircraft electric power generating devices.

FIG. 9 illustrates a structural diagram schematically showing the connection, with the engine E, of the aircraft electric generating device, now identified by 1A, designed in accordance with a second preferred embodiment of the present invention, wherein component parts similar to corresponding with those shown in FIG. 2 are designated by like reference numerals and, therefore, the details thereof are not reiterated for the sake of brevity. The electric power generating device 1A according to the second embodiment differs from the electric power generating device 1, particularly shown in FIG. 1, in that the use of the transmitting shaft 17 is dispensed with and, instead, a bevel gear 59A of the transmitting mechanism 21A is meshed directly with a bevel gear 59B provided on the transmission input shaft 28 of the traction transmission 22 to achieve a geared connection. Even with this transmitting mechanism 21A, in a manner similar to the transmitting mechanism 21 shown in FIG. 2, the rotation of the transmitting mechanism input shaft 27 can be transmitted to the traction transmission 22 after having been converted into the rotation in a direction perpendicular to the transmitting mechanism input shaft 27 about the axis.

It is, however, to be noted that the transmission 22 may not be always limited to a traction stepless transmission, but may be in the form of a belt drive type continuously variable transmission or any other stepless transmission.

Furthermore, those skilled in the art will readily conceive numerous changes and modifications within the framework of obviousness upon the reading of the specification herein presented of the present invention and, accordingly, such changes and modifications are to be construed as included therein.

REFERENCE NUMERALS 1, 1A . . . Aircraft electric power generating device
2 . . . Compressor
7 . . . High pressure shaft
9 . . . Low pressure shaft (Rotary shaft)
10 . . . Fan
21, 21A . . . Transmitting mechanism
22 . . . Traction transmission (Transmission)
27 . . . Transmitting mechanism input shaft (Input shaft)
31 . . . Pump rotary shaft (Geared shaft)
32 . . . Intermediate gear
33 . . . Oil pump
34 . . . Electric power generator
40 . . . Casing
43 . . . Opening
44 . . . Mounting flange
E . . . Aircraft engine
FC . . . Fan casing
IN . . . Transmission input unit
OT . . . Transmission output unit
R . . . Radial direction

What is claimed is:

1. An electric power generating device adapted to be driven by an aircraft engine, which the electric power generating device comprises:
a transmission connected with a rotary shaft of the engine;
an electric power generator driven by an output of the transmission;
an input shaft having a shaft axis extending in a direction crossing the rotary shaft and connected with the rotary shaft;
a transmitting mechanism connected with the input shaft to drive the transmission about an axis extending in a direction crossing the input shaft;
the transmission and the electric power generator being disposed spaced a distance from each other in a direction circumferentially of the rotary shaft, and the input shaft being disposed between the transmission and the electric power generator in the direction circumferentially of the rotary shaft; and
an accessory casing configured to accommodate the transmission and the electric power generator therein,
wherein the input shaft is connected with the rotary shaft by a connecting shaft provided in the engine and having a shaft axis extending in the direction crossing the rotary shaft,
wherein the accessory casing is detachably connected to a fan casing which encircles the rotary shaft,
wherein a first end of the input shaft is exposed to an outside of the accessory casing, and the first end of the input shaft is connected to a radial outer end of the connecting shaft,
wherein a second end of the input shaft is placed inside the accessory casing,
wherein the transmitting mechanism comprises a first bevel gear and a second bevel gear,
wherein the transmitting mechanism is configured to convert the rotation of the input shaft about the direction crossing the rotary shaft to a rotation about an axis different from the direction crossing the rotary shaft,
wherein the first bevel gear is connected to the second end of the input shaft,
wherein the second bevel gear is fixedly mounted on one end of a transmission shaft connected to the transmission and the second bevel gear is meshed with the first bevel gear, and
wherein the transmission shaft transfers a rotational input from the second bevel gear to the transmission.

2. The electric power generating device as claimed in claim 1, wherein the transmission and the electric power generator have respective shaft axes that extend parallel to each other, and axial positions of at least portions thereof being overlapped one above the other.

3. The electric power generating device as claimed in claim 1, which is driven by the engine comprising a low pressure shaft for driving a fan and a high pressure shaft for driving a compressor and in which the rotary shaft is the low pressure shaft.

4. The electric power generating device as claimed in claim 1, wherein the transmission is a traction continuously variable transmission.

5. The electric power generating device as claimed in claim 4, wherein the traction continuously variable transmission is of a double cavity type in which an input unit is provided at an intermediate portion of the axial direction thereof and an output unit is provided at an outer side portion thereof.

6. The electric power generating device as claimed in claim 1, wherein the accessory casing has an opening for the passage of the input shaft therethrough and a flange encircling a perimeter of the opening, the accessory casing being fitted to the engine through such flange.

7. The electric power generating device as claimed in claim 1, further comprising an intermediate gear for connecting between the transmission and the electric power generator.

8. The electric power generating device as claimed in claim 7, further comprising a pump connected with a gear shaft of the intermediate gear, the pump being operable to supply a lubricant.

9. The electric power generating device as claimed in claim 1, wherein the transmission and the electric power generator have respective shaft axes that extend parallel to the rotary shaft of the engine.

10. The electric power generating device as claimed in claim 1, wherein the shaft axis of the input shaft extends in a radial direction of the rotary shaft of the engine.

\* \* \* \* \*